United States Patent [19]

Patel

[11] 4,256,427
[45] Mar. 17, 1981

[54] AUTOMATIC WIRE STACKER APPARATUS

[75] Inventor: Jayantilal S. Patel, El Monte, Calif.

[73] Assignee: Eubanks Engineering Co., Monrovia, Calif.

[21] Appl. No.: 14,935

[22] Filed: Feb. 26, 1979

[51] Int. Cl.³ ............................................. B65H 29/26
[52] U.S. Cl. ........................................ 414/77; 83/81;
    83/157; 140/140; 198/626; 198/836; 414/80;
    414/745; 226/171
[58] Field of Search ...................... 414/14, 15, 69, 76,
    414/77, 80, 81, 97, 745, 748; 226/171, 184;
    198/627, 817, 836, 626; 83/81, 82, 157; 140/140

[56] References Cited

U.S. PATENT DOCUMENTS

| | | | |
|---|---|---|---|
| 1,405,233 | 1/1922 | Lemoine | 198/817 |
| 1,505,991 | 8/1924 | Wiseman | 140/140 |
| 2,901,128 | 8/1959 | Barski | 414/80 |
| 3,306,472 | 2/1967 | Blanz | 414/748 |
| 3,417,854 | 12/1968 | Bilocq | 414/80 X |
| 3,794,233 | 2/1974 | Dykmans | 226/184 X |
| 3,848,725 | 11/1974 | Toby | 414/80 X |
| 4,095,497 | 6/1978 | Radford et al. | 83/157 |
| 4,104,846 | 8/1978 | Waller | 414/77 X |

OTHER PUBLICATIONS

Filomat Cable Stacking Mechanism leaflet.

*Primary Examiner*—Leslie J. Paperner
*Attorney, Agent, or Firm*—Robert M. McManigal

[57] ABSTRACT

Apparatus for successively receiving and transporting long cut lengths of wire from a wire cutting mechanism and stacking the cut lengths in a receiver, a pair of long looped belts being supported with confronting surface faces coacting to form a longitudinally moving V-trough having an inlet and coupled with the wire delivery end of the cutting mechanism. One of the belts is supported on a fixed frame structure, and the other belt is supported upon a pivoted frame structure, a power actuator being selectively energizable to swing the pivoted frame structure in a direction to separate the converging belts and form an elongate discharge opening along the bottom of the trough through which the delivered cut wire length in the trough may be discharged by gravity into a receiver, and thereafter swing the pivoted frame in an opposite direction to close the discharge opening. Controls are provided for manually delaying the opening and closing operations of the converged belts in response to a signal from the cutting mechanism at the conclusion of each of its wire cutting operations.

1 Claim, 6 Drawing Figures

AUTOMATIC WIRE STACKER APPARATUS

BACKGROUND OF THE INVENTION

The present invention relates generally to the art of cutting and handling of materials.

In the wire cutting and stripping industry, the wire feeding mechanisms of the conventional wire cutting and stripping apparatus is arranged to push the wire through the wire cutters until the required length extends beyond the cutters. When the required lengths reach relatively long proportions, a point is reached in which the feeding mechanism no longer has sufficient power to effectively push the wire. Thus, a problem arises due to the inability of the mechanism to effectively carry or transport the long portions of wire extending beyond the cutters, and to stack these long cut wires in an orderly fashion.

It has been found that if the wire is not properly transported, there is an imminent possibility of its jamming, and thus necessitate shutting down the apparatus with a concomitant loss of time and materials.

The present invention proposes to solve the foregoing problem by providing a pair of long looped belts which are arranged with their confronting surface faces in converging relation to provide a longitudinally moving V-trough for receiving and transporting the wire lengths as the wire issues from the cutting mechanism. A power actuator is arranged to open the converged edges of the trough to discharge the received cut length into a receiver by gravity, and thereafter close the edges for the reception of another cut length in delayed timed relation to a signal from the cutting mechanism indicating the completion of a cutting operation.

SUMMARY OF THE INVENTION

The present invention relates more specifically to improved apparatus for receiving and transporting long strips of material from a cutting mechanism, and the stacking of these strips into an associated receiver.

It is one object of the herein disclosed invention to provide a new and improved apparatus for transporting and stacking relatively long cut lengths of wire and other materials which are delivered from a cutting apparatus.

A further object is to provide a unique apparatus for receiving and stacking long lengths of filamentary-like materials, in which each length is delivered endwise into one end of a moving V-trough formed by the confronting faces of a pair of looped belts, and in which the belts are relatively moved to form a discharge opening along the bottom of the trough to gravitationally discharge a length of wire therein into a receiver.

Another object is to provide wire stacking apparatus according to the previous object, in which provision is made for opening and closing the bottom of the trough in independently adjustable delayed operations, in response to a signal indicating the completion of a cutting operation in an associated wire cutting mechanism.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 6 is a schematic diagram showing the control for delayed opening and closing of the trough in response to a signal from the cutting mechanism indicating the completion of a cutting operation.

DESCRIPTION OF A PREFERRED EMBODIMENT

Figure 1:
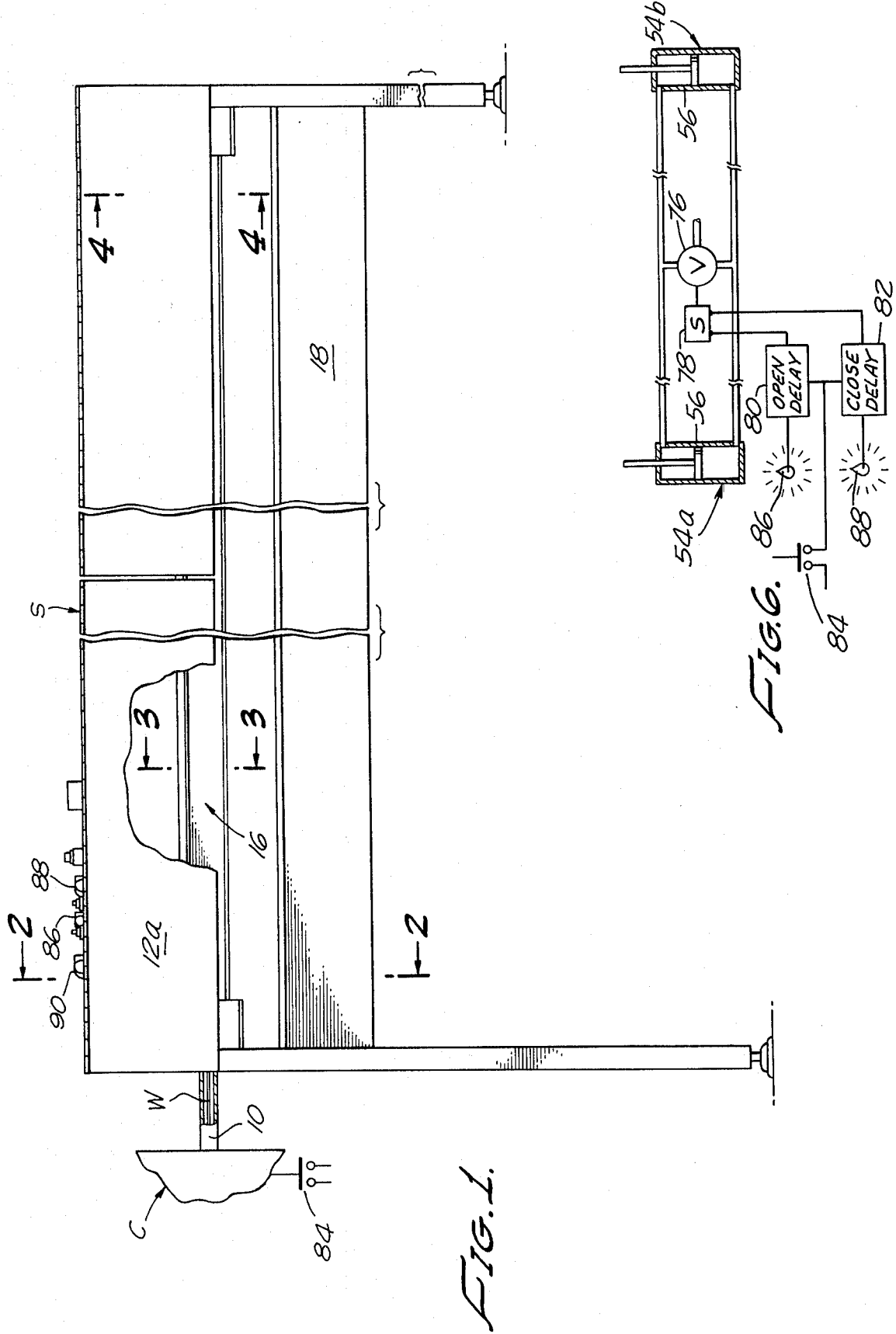
FIG. 1 is a side elevational view of wire stacker apparatus according to the present invention, the apparatus being shown in association with an associated wire cutting mechanism.

Referring now more specifically to the drawings, the apparatus of the present invention is shown in FIG. 1 as comprising in general a wire stacker apparatus, as generally indicated at S, which is coupled with cutter and stripping mechanism, as generally indicated at C, which is adapted to cut and strip predetermined lengths of wire W and deliver them through an outlet 10 endwise into the adjacent end of the wire stacker apparatus.

The components of the wire stacker are housed within an elongated housing 12 which includes a forward or front hinged section 12a which may be swung to an open position to give access to the interior of the housing and the components therein. The housing 12 contains the wire transporting mechanism of the present invention, as generally indicated by the numeral 14, and includes a moving V-trough structure 16 which extends the length of the housing 12 and is adapted to receive the lengths of wire which are delivered from the wire cutter and mechanism C and thereafter discharge these lengths of wire through the open bottom of the housing 12 into an underlying receiver pan 18 of generally V-shaped cross section.

The V-trough structure 16 is accomplished by utilizing cooperatively associated frame structures which extend between the ends of the housing 12 and are composed of a fixed frame structure 20 and a laterally movable frame structure 22. The fixed frame structure embodies attaching end brackets 24a and 24b which are interconnected by an elongate channel member 26. An elongate looped belt 28a extends between the end brackets 24a and 24b, this belt being trained over an appropriate crowned idler roller 30 which is rotatably supported in the bracket 24b, and a similar roller 32 which is rotatably mounted in the bracket 24a and has a driving connection with a driving motor 34. The parallel belt runs are thus positioned on opposite sides of the channel member 26, and as thus arranged, it will be seen that the web wall 36 of the channel provides a guiding and supporting backup wall for the overlying run of the belt.

Figure 5:
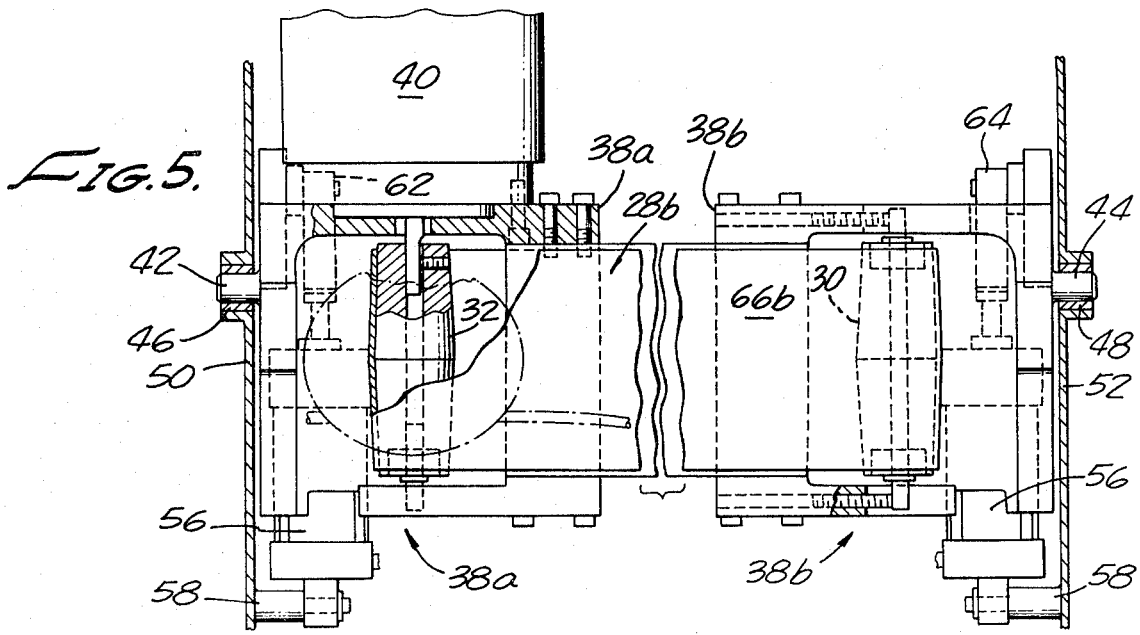
FIG. 5 is a longitudinal sectional view lengthwise of the trough, taken substantially on line 5—5 of FIG. 2, and showing details of the mounting structure for one of the conveyor belts.

In a like manner, the movable frame structure 22 consists of attaching end brackets 38a and 38b, an elongate interconnecting channel member 26, a belt 28b, an idler roller 30 and a drive roller 32 which is, in this case, drivingly connected to a driving motor 40. The movable frame structure as thus described is supported for swinging or tilting movements upon an appropriate trunion 42 on the end bracket 38a, and a trunion 44 on the end bracket 38b (FIG. 5). The trunions 42 and 44 are respectively supported in companion bearings 46 and 48 carried by the housing end walls 50 and 52. Swinging movement of the frame structure 22 is accomplished by means of synchronously energizable power units 54a and 54b. The power unit 54a is disclosed as comprising a double acting pneumatic cylinder 56 which is pivotally anchored at 58 on the end wall 50 and has a piston rod 60 connected with a lug 62 on the end bracket 38a. In the case of power unit 54b, the cylinder is pivoted on the end wall 52 and the piston is connected to a lug 64 on the bracket 38b.

Figure 2:
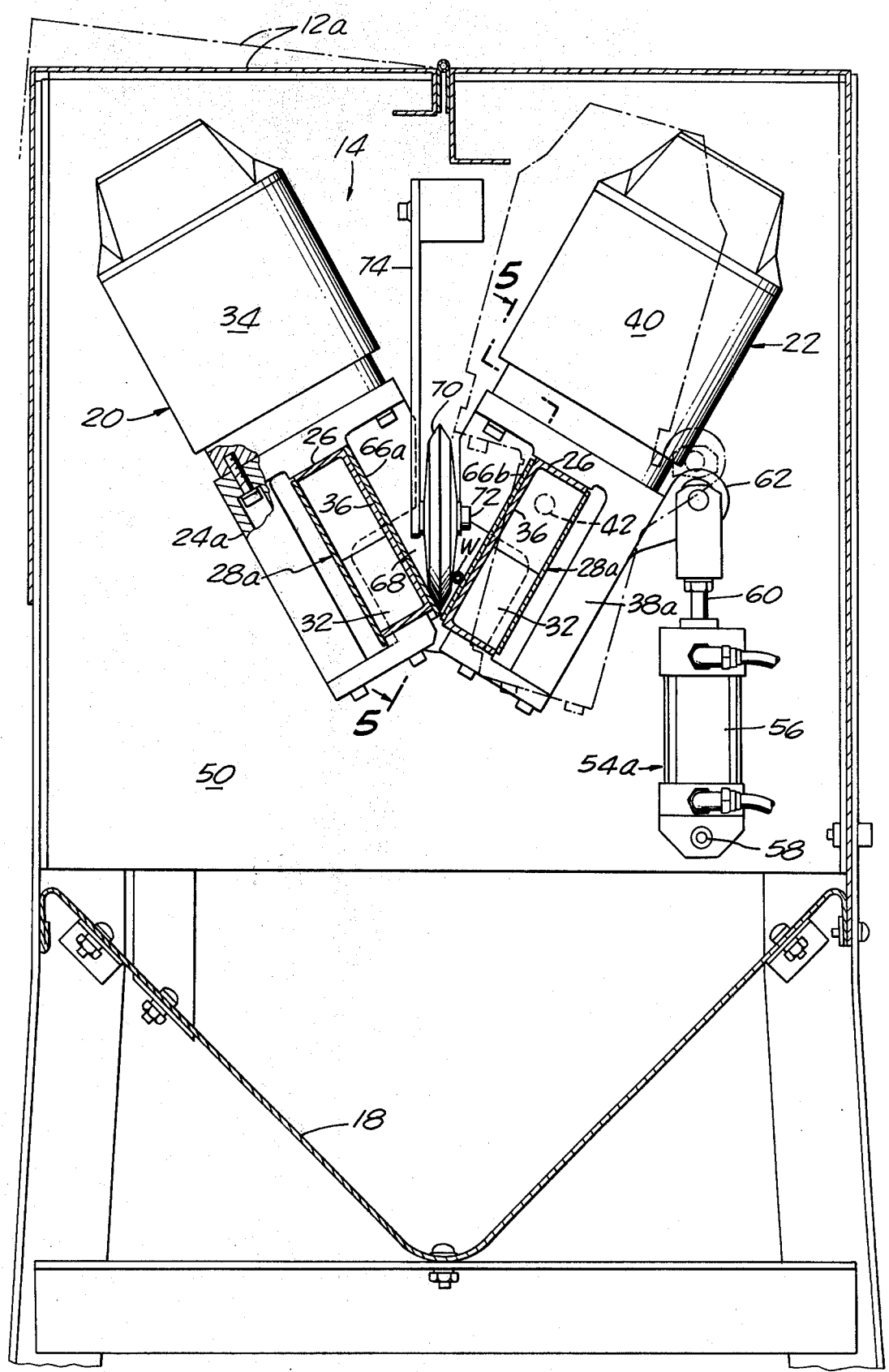
FIG. 2 is an enlarged transverse section at the receiving end of the apparatus, taken substantially on line 2—2 of FIG. 1, and showing details of the power means for driving the belts and shifting one of the belts transversely with respect to the other.
Figure 4:
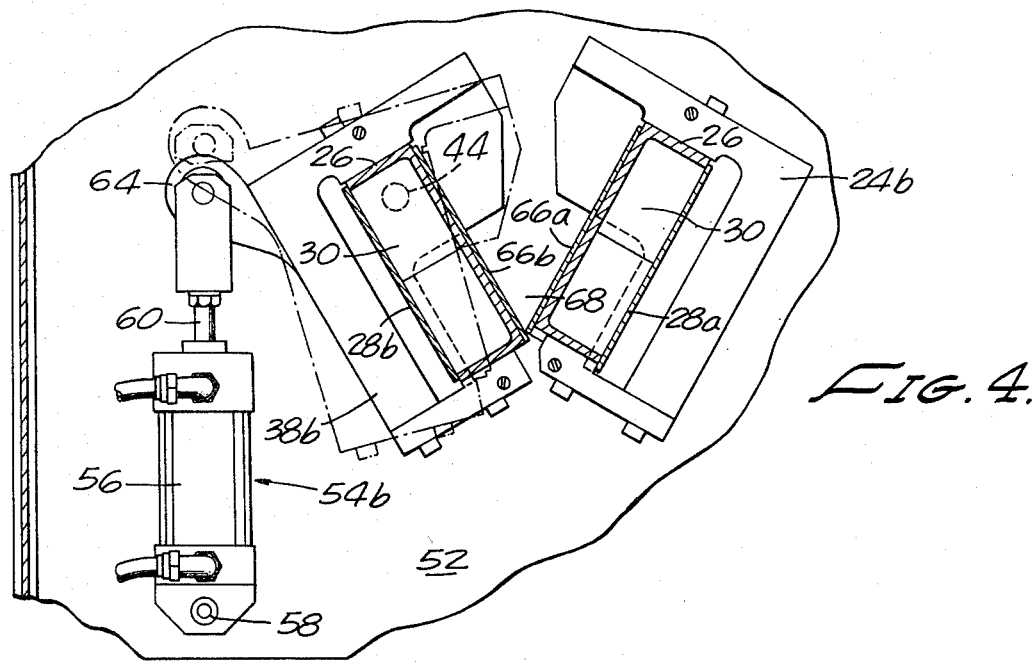
FIG. 4 is a transverse sectional view through the trough structure, taken substantially on line 4—4 of FIG. 1, and disclosing details of the mounting for the belts at the far end of the apparatus.
Figure 3:
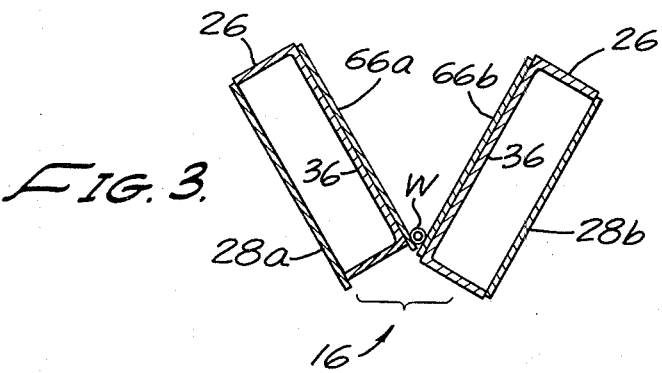
FIG. 3 is an intermediate transverse section through the V-trough structure, taken substantially on line 3—3 of FIG. 1.

Normally, the frame structures 20 and 22 are positioned as shown in full lines in FIGS. 2 and 4, wherein the confronting faces 66a and 66b of the belts 28a and 28b coact to form the movable sides of a V-trough 68, and wherein the lowermost edge of the belt face 66b extending beyond and overlapping the lowermost edge of the belt face 66a. This constitutes the closed position of the trough, and is the position in which the wire W is received by endwise movement from the outlet 10 of the cutter and stripper mechanism C. The movements of the belt faces 66a and 66b are in a direction away from end wall 50 and towards the end wall 52 of the housing. When the full length of the cut wire has been received, the power units 54a and 54b will be energized to swing the movable frame structure 22 to the position as shown in phantom lines and separate the confronting belt faces at the bottom of the V-groove to form an elongate discharge opening which will let the wire length drop bodily out of the V-groove and into the receiver pan 18. The power units 54a and 54b will then be again energized to return the frame structure 22 to its full line position for receiving the next wire.

Transport of the received wire is further facilitated, particularly in the case of relatively fine wire, by the provision of a beveled idler gripping wheel 70 which is rotatably supported upon a suitable pinion 72 at the lower end of a supporting bracket 74 having its upper end anchored to the end wall 50. The wheel 70 is frictionally driven by its peripheral engagement with the belt face 66a.

It will be appreciated that for the stacking of different lengths of cut material, the opening and closing operations of the V-trough will have to be modified in timed relation to the cutting operation of the cutter mechanism. As shown in FIG. 6, the cylinders 56 of the respective power units 54a and 54b are energized for opening and closing operations through connected control means which includes an open delay circuit 80 and close delay circuit 82 in response to the closure of a signal transmitting switch 84 associated with the cutter mechanism C and adapted to send out a signal for each cutting operation. The extent of delay is manually adjustable in the case of the circuit 80 by a knob 86, and in the case of the circuit 82 by a knob 88. These control knobs, as well as other controls including a speed control knob 90 for the driving motors 34 and 40, are conveniently mounted on a top portion of the housing 12, as shown in FIG. 1.

From the foregoing description, it is believed that it will be appreciated that the heretofore outlined objects of the invention will be attained, and that the apparatus embodying the described features provides inherent advantages in apparatus for the stacking of relatively long cut lengths of wire and other materials as they are successively produced by a cutting mechanism.

Various modifications may suggest themselves to those skilled in the art without departing from the spirit of the disclosed invention, and, hence, it is not wished to be restricted to the specific form shown or uses mentioned, except to the extent indicated in the appended claims.

I claim:

1. Apparatus for receiving and stacking elongated pieces of material successively longitudinally delivered in measured cut lengths from the output end of a cutting mechanism comprising:
    a. An elongate main frame structure having a receiving end adapted to be coupled with the output end of the cutting mechanism;
    b. a pair of elongate movably mounted belts extending lengthwise of said frame structure, said belts having confronting surface faces coacting to form a trough with one end positioned to receive each piece of cut material by an endwise movement from the output of said mechanism;
    c. belt driving means for simultaneously moving the belt faces in a direction to carry the received pieces away from the outlet end of the mechanism;
    d. means for separating the belt faces to bodily discharge a received piece by gravity from the trough into a receiver; and
    e. a rotatable bevelled idler wheel positioned at the input end of the trough and frictionally driven from one of said belts for coaction with the other of said belts to initially grip the received pieces.

* * * * *